United States Patent [19]
Schneider

[11] Patent Number: 5,812,620
[45] Date of Patent: Sep. 22, 1998

[54] PROPORTIONAL COUNTER

[75] Inventor: Donald Albert Schneider, Lakewood, Ohio

[73] Assignee: General Electric Company, Schenectady, N.Y.

[21] Appl. No.: 749,464

[22] Filed: Nov. 15, 1996

[51] Int. Cl.⁶ .................................................... G01T 3/00
[52] U.S. Cl. ...................... 376/153; 250/390.01
[58] Field of Search .................. 376/153–155; 250/390.01, 390.11, 374

[56] References Cited

U.S. PATENT DOCUMENTS

| | | | |
|---|---|---|---|
| 2,462,471 | 2/1949 | Crumrine | 250/27.5 |
| 2,837,677 | 6/1958 | Hendee et al. | 313/93 |
| 2,968,726 | 1/1961 | Bersin et al. | 250/83.1 |
| 3,444,376 | 5/1969 | Perelman et al. | 250/83.6 |
| 3,678,275 | 7/1972 | Schneider et al. | 250/83.6 R |
| 3,688,114 | 8/1972 | Youmans | 250/71.5 R |
| 3,702,409 | 11/1972 | Goodings et al. | 313/610 |
| 3,710,166 | 1/1973 | Perelman et al. | 313/93 |
| 4,042,826 | 8/1977 | Thomas | 250/336 |
| 4,463,264 | 7/1984 | Young et al. | 250/390 |

FOREIGN PATENT DOCUMENTS 5104777   8/1980   Japan ................................. 376/154

*Primary Examiner*—Harvey E. Behrend
*Attorney, Agent, or Firm*—Armstrong, Teasdale, Schafly & Davis

[57] ABSTRACT

Proportional counters for thermal neutron counting are described. In one embodiment, a proportional counter includes a lead wire, a coil spring and an anode wire. The coil spring includes two opposite ends and a substantially cylindrical opening extending between the two ends. The lead wire at least partially extends into the spring opening so that one end of the lead wire is within the spring opening. One end of the spring is secured to the lead wire, and the other end of the spring is secured to the anode wire.

11 Claims, 1 Drawing Sheet

PROPORTIONAL COUNTER

FIELD OF THE INVENTION

This invention relates generally to proportional counters and, more particularly, to supporting a proportional counter anode wire, at a desired and substantially constant tension.

BACKGROUND OF THE INVENTION

Proportional counters for neutron counting are typically used in oil, gas and mineral exploration, as well as in connection with nuclear reactors and industrial gaging. Such proportional counters are commercially available, for example, from Reuter Stokes, 8499 Darrow Road, Twinsburg, Ohio 44087 (an exemplary counter is model number RS-P4-0806-207).

Known proportional counters typically include a substantially cylindrical cathode, and an anode wire extends through the cathode. The cathode is sealed at both ends, and may be filled with a gas, such as Helium-3 gas. The anode wire, of course, is insulated from the cathode. For example, a support insulator is secured to the anode at one end of the cathode and insulates the one end of the anode from the cathode. At the other end of the cathode, the wire is electrically connected to a lead wire, and the lead wire extends through a seal tube positioned at the end of the cathode.

In order to ensure accurate neutron counting, it is important to maintain the anode wire taut. However, particularly in some applications and due to temperature variations, keeping the anode wire taut is a significant challenge. For example, in an extremely hot operating environment, the cathode expands more than the anode. As the cathode expands, the tension on the anode wire is increased. Such expansion would stretch or break the anode. A spring is required to maintain anode wire tension.

In the past, a tension spring coupled at one end to the anode wire and coupled at its other end to the lead wire has been used to keep the anode wire taut in a variety of operating conditions. Although such an assembly of the anode wire, spring and lead wire provides satisfactory results, the assembly is susceptible to vibration failure. Particularly, if the counter is subjected to prolonged vibration, the spot welds between the spring, anode wire and lead wire have been found to sometimes fail.

Accordingly, it is desirable to provide a proportional counter which provides consistent and accurate readings in a wide range of temperature conditions and during vibration. It also would be desirable to provide such a proportional counter in which the anode wire is maintained substantially taut in a wide variety of applications and is less susceptible to vibration failure, without significantly increasing the costs of the proportional counter.

SUMMARY OF THE INVENTION

These and other objects are attained by proportion counter which, in one embodiment, includes an anode assembly including a coil, or tension, spring secured at one end to the anode wire and having the lead wire extending at least partially therethrough. More particularly, and in accordance with one embodiment of the present invention, the coil spring includes opposing ends and a substantially cylindrical opening extending between the opposing ends. The lead wire extends partially into the spring opening, and the one end of the coil spring is spot welded to the lead wire at an intermediate location, i.e., at a location spaced from the end of the lead wire located within the coil spring. The other end of the spring is spot welded to the anode wire.

The coil spring and anode wire are located within a substantially cylindrical cathode, and the end of the anode wire opposite the coil spring is secured to a support insulator located within the cathode. The lead wire extends through a seal tube in the end of the cathode opposite the support insulator. The cathode may be filled with, for example, Helium-3 gas.

The above described proportional counter is believed to provide consistent and accurate readings in a wide range of temperature conditions and during vibration. In addition, the above described anode assembly is maintained substantially taut in a wide variety of applications and is less susceptible to vibration failure than other known spring based assemblies. Further, the above described anode assembly is not believed to significantly increase the fabrication and assembly costs of the counter.

DETAILED DESCRIPTION OF THE DRAWINGS

Figure 1:
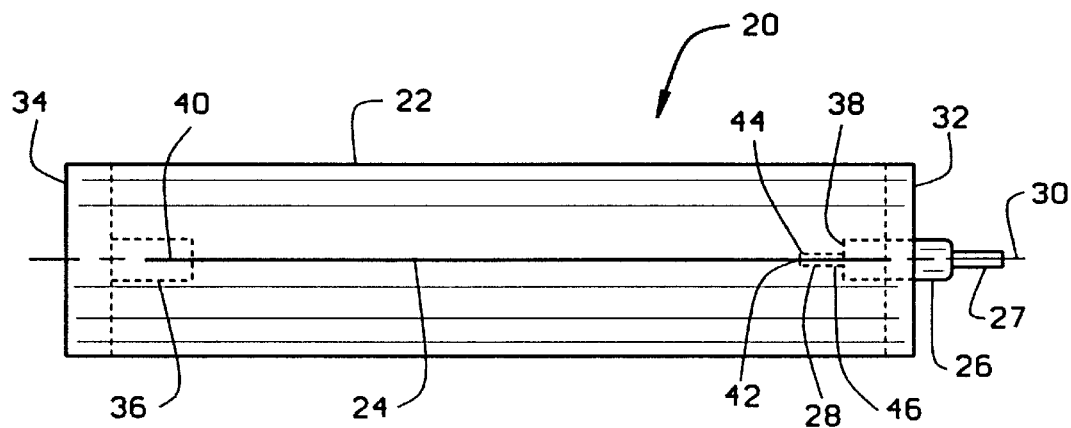
FIG. 1 is a schematic, partial cross-sectional view of a proportion counter.

FIG. 1 is a schematic, partial cross-sectional view of a proportion counter 20. Proportion counter 20 includes a cathode 22, an anode wire 24, a ceramic seal 26, a seal tube 27 extending through seal 26, a tension spring 28 and a lead wire 30. Cathode 22 is substantially cylindrical and includes a first end 32 and a second end 34. Second end 34 of cathode 22 includes a support insulator 36 (shown in dotted lines) configured to secure to, and support, anode wire 24. First end 32 of cathode 22 has an opening (not shown), and ceramic seal 26 seals off cathode first end 32. Seal tube 27 extends through seal 26. Seal tube 27 is substantially cylindrical and includes an opening (not shown) extending longitudinally therethrough. Lead wire 30 extends through seal tube 27 so that one end 38 of lead wire 30 is within cathode 22 yet cathode 22 is completely sealed. Cathode 22 may, for example, be filled with Helium-3 gas.

Anode wire 24 is positioned coaxially within cathode 22 so that a first end 40 of anode wire 34 is secured to support insulator 36 and a second end 42 of anode wire 34 is electrically coupled to lead wire 30. Particularly, second end 42 of anode wire is secured to one end 44 of tension spring 28, and end 38 of lead wire 38 is secured to the other end 46 of tension spring 28. As described above, and in known configurations, spring ends 44 and 46 typically are spot welded to second end 42 of anode wire 34 and end 28 of lead wire 30, respectively.

Although such an assembly of anode wire 34, spring 28 and lead wire 30 provides satisfactory results, the assembly is susceptible to vibration failure. Particularly, if counter 20 is subjected to vibrations, the spot welds between spring 28 and anode wire 34, and between spring 28 and lead wire 30, have been found to sometimes fail.

Figure 2:
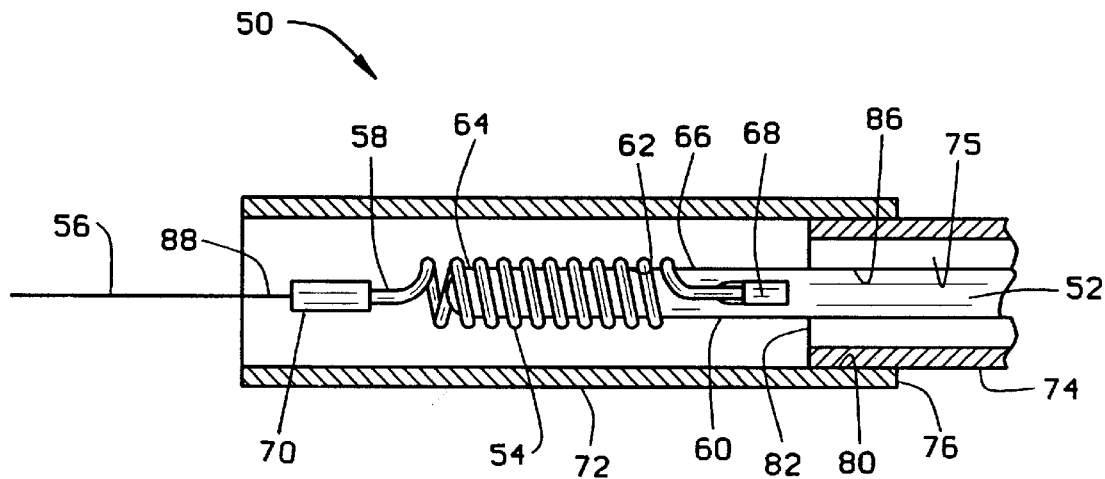
FIG. 2 is a schematic, partial cross-sectional view with parts cut-away of a proportion counter including an anode assembly in accordance with one embodiment of the present invention.

To overcome such vibration failure without significantly increasing the fabrication cost of counter 20, an anode assembly as illustrated in FIG. 2 may be utilized. Particularly, and referring to FIG. 2 which is a schematic, partial cross-sectional view with parts cut-away of a counter 50, such counter 50 includes a lead wire 52, a coil spring 54, and an anode wire 56. Coil spring 54 may, for example, be a helical coil spring as is well known in the art, and includes a first end 58 and an opposing second end 60. A substantially cylindrical opening 62 extending between ends 58 and 60. Lead wire 52 extends into spring opening 62 so that an end 64 of lead wire is within spring opening 62 and a portion 66 of lead wire 52 extends from spring opening 62. Second end 60 of spring 54 is secured to lead wire 52. Particularly, and for example, second end 60 of spring 54 is spot welded with a filament holder 68 to portion 66 of lead wire 52. First end 58 of spring 54 is secured to anode wire 56. First end 58 of spring 54 may, for example, be spot welded with a filament holder 70 to anode wire 56.

Proportional counter 50 further includes a cathode 72, a ceramic seal 74, and a seal tube 75. Cathode 72 is substantially cylindrical and includes a first end 76 and a second end 78 (only first end 76 is shown in FIG. 2). First end 76 of cathode 72 includes an opening 80 therein, and seal 74 seals off first end 76. Seal tube 75 extends through seal 74, and seal tube 75 is substantially cylindrical and includes a first end 82, a second end (not shown), and a bore 86 extending between first end 82 and the second end. Bore 86 is sized to receive lead wire 52. Second end 78 of cathode 72 may, for example, include a support insulator identical to support insulator 36 (FIG. 1).

To assemble proportional counter 50, end 64 of lead wire 52 is inserted into and through seal tube bore 86. Second end 60 of spring 54 is then secured, or spot welded, to lead wire portion 66. Similarly, a first end 88 of anode wire 56 is secured, or spot welded, to first end 58 of spring 54. A second end (not shown in FIG. 2) of anode wire 56 is, for example, secured to the support insulator at second end 78 of cathode 72. Seal 74 and seal tube 75 are then secured to cathode 72 so that seal tube 75 extends through cathode opening 80. As explained above, cathode 72 may be filled with a gas such as Helium-3 gas.

Proportion counter 50 is believed to provide consistent and accurate readings in a wide variety of temperature conditions. In addition, the above described anode assembly is believed maintain anode wire 56 substantially taut in a wide variety of applications and is less susceptible to vibration failure than other known spring based assemblies. Further, the above described anode assembly is not believed to significantly increase the fabrication and assembly costs of counter 50 as compared to, for example, counter 20.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A proportional counter, comprising:

a substantially cylindrical cathode comprising first and second opposing ends;

an anode wire extending substantially coaxially within said cathode;

a coil spring comprising first and second opposing ends and a substantially cylindrical opening extending between said first and second ends, said anode wire secured to said first spring end without extending into said spring opening; and a lead wire extending into said spring opening, said second spring end secured to said lead wire.

2. A proportional counter in accordance with claim 1 wherein said coil spring is a helical coil spring.

3. A proportional counter in accordance with claim 1 wherein said second spring end is spot welded to said lead wire.

4. A proportional counter in accordance with claim 1 wherein said lead wire extends through said cathode first end.

5. A proportional counter in accordance with claim 4 further comprising a support insulator located at said cathode second end, an end of said anode wire coupled to said support insulator.

6. A method of assembling a proportional counter for thermal neutron counting, the proportional counter including a lead wire, a coil spring having first and second opposing ends and a substantially cylindrical opening extending between the first and second ends, and an anode wire, said method comprising the steps of:

securing the anode wire to the first spring end without extending the anode wire into the spring opening;

extending the lead wire into the spring opening; and securing the second end of the spring to the lead wire.

7. A method in accordance with claim 6 wherein securing the first end of the spring to the anode wire comprises the step of spot welding the first end of the spring to the anode wire.

8. A method in accordance with claim 6 wherein securing the second end of the spring to the lead wire comprises the step of spot welding the second end of the spring to the lead wire.

9. An anode assembly for proportional counter, said anode assembly comprising:

an anode wire;

a coil spring comprising first and second opposing ends and a substantially cylindrical opening extending between said first and second ends, said anode wire secured at one end to said first spring end without extending into said spring opening; and a lead wire extending into said spring opening, said second spring end secured to said lead wire.

10. An anode assembly in accordance with claim 9 wherein said coil spring is a helical coil spring.

11. An anode assembly in accordance with claim 9 wherein said second spring end is spot welded to said lead wire.

* * * * *